Aug. 30, 1966  R. R. PETERSON  3,270,193
AIRCRAFT WING LIGHT
Filed Feb. 17, 1964
3 Sheets-Sheet 1
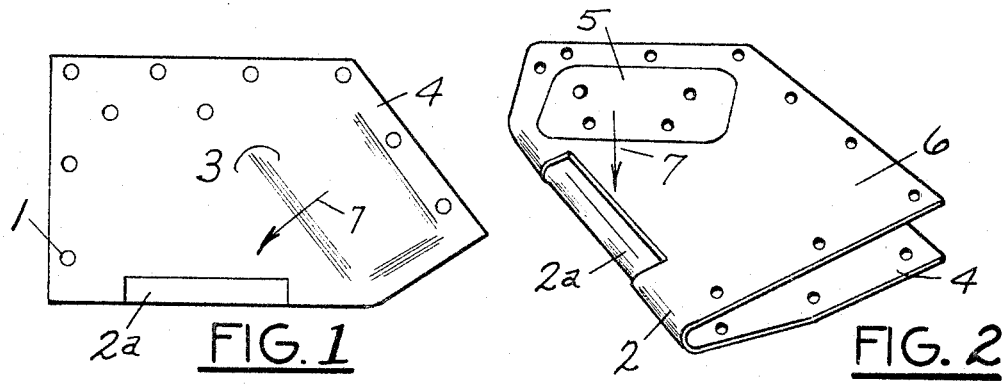
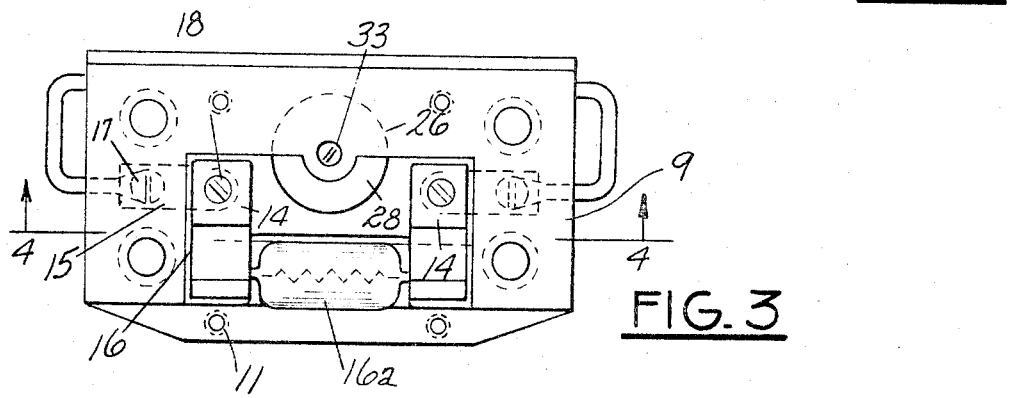
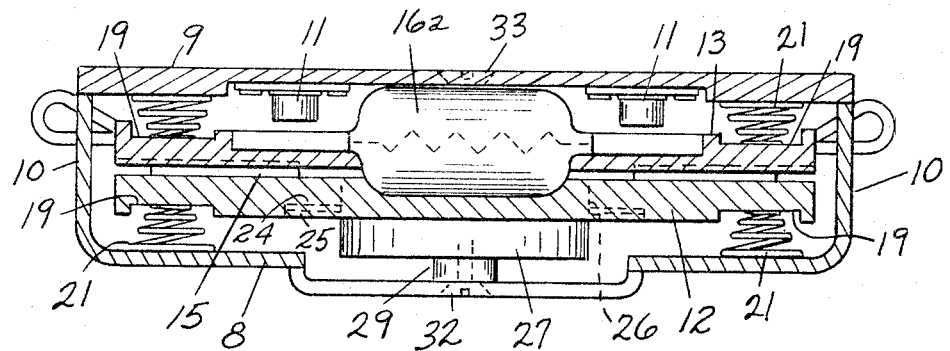
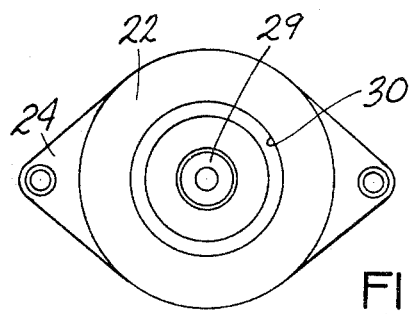
INVENTOR.
Robert R. Peterson
BY Ralph Hammar
attorney Aug. 30, 1966  R. R. PETERSON  3,270,193
AIRCRAFT WING LIGHT
Filed Feb. 17, 1964
3 Sheets-Sheet 2
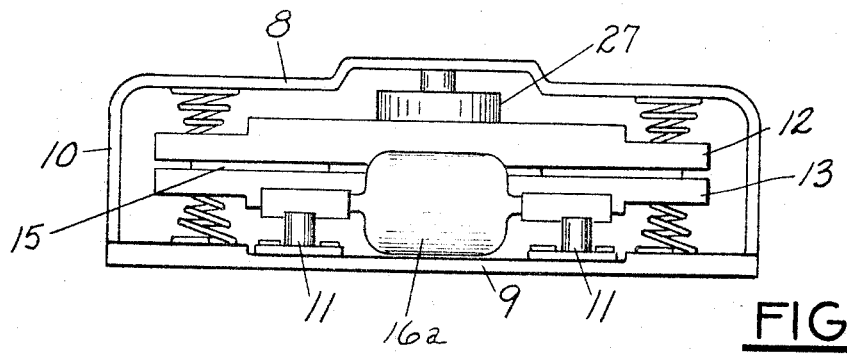
FIG. 5
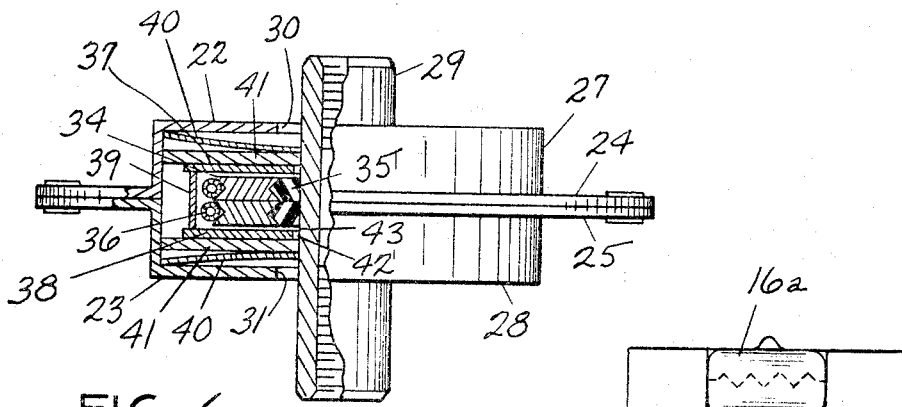
FIG. 6
FIG. 8
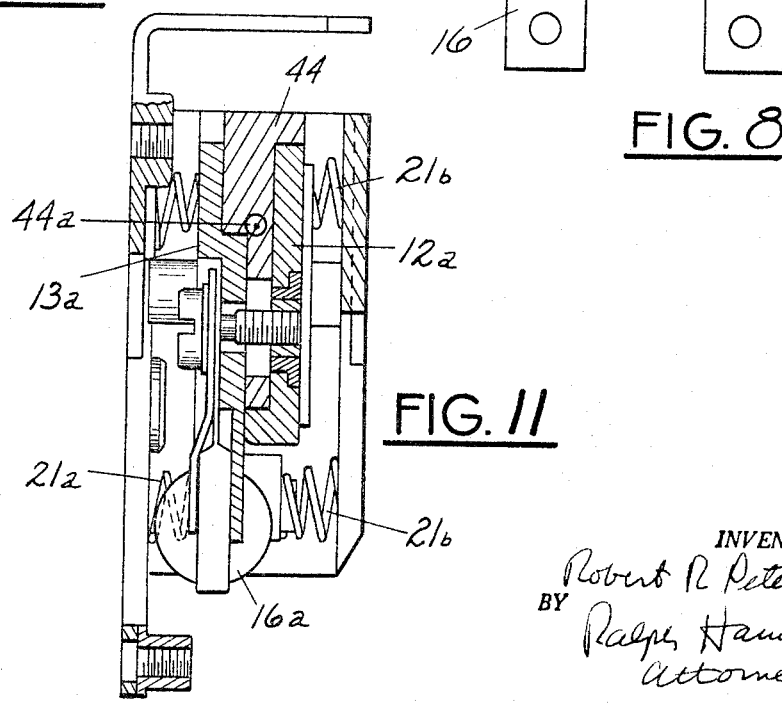
FIG. 11
INVENTOR.
Robert R. Peterson
BY Ralph Hammar
Attorney

United States Patent Office 3,270,193
Patented August 30, 1966

3,270,193
AIRCRAFT WING LIGHT
Robert R. Peterson, Erie, Pa., assignor to Lord Corporation, a corporation of Pennsylvania
Filed Feb. 17, 1964, Ser. No. 345,139
14 Claims. (Cl. 240—7.7)

This invention is an aircraft wing light which will stand the shocks, vibration and ambient temperatures of supersonic aircraft.

Figure 9:
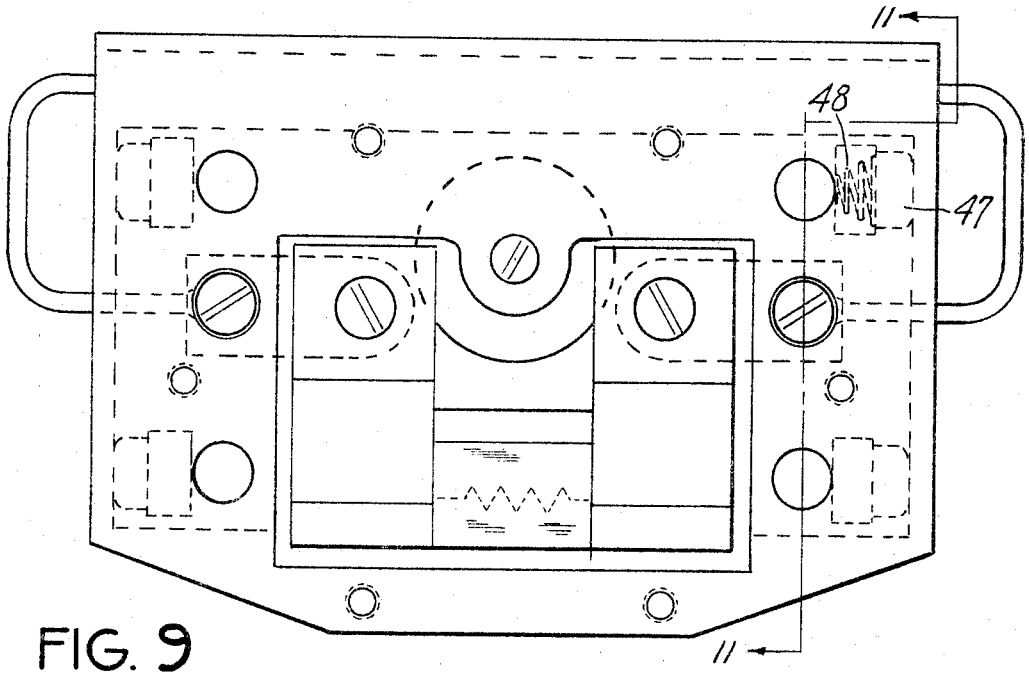
Figure 10:
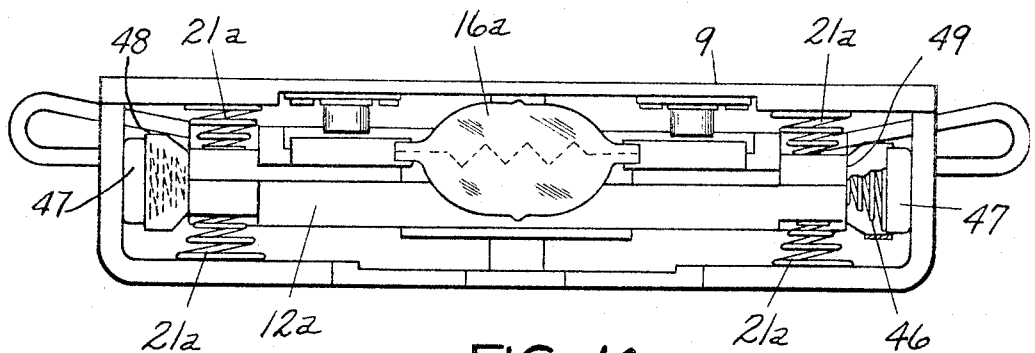

In the drawing, FIG. 1 is a top plan view of an aircraft wing light, FIG. 2 is a bottom perspective, FIG. 3 is a bottom plan of the light mounting assembly, FIG. 4 is a section on line 4—4 of FIG. 3, FIG. 5 is a front view of the mounting assembly, FIG. 6 is an elevation partially in section of the damper, FIG. 7 is a plan view of the damper, FIG. 8 is a plan view of the lamp, FIG. 9 is a bottom plan view of a modification of the light mounting assembly, FIG. 10 is a front view of the modification, and FIG. 11 is a section on line 11—11 of FIG. 9.

The wing light is a folded sheet metal insert having screw holes 1 along the ends and back for attachment to the wing. In the front edge 2 is fixed a lens 2a receiving light from a light mounting assembly arranged between a projection 3 on the top wall 4 and a cover plate 5 on the bottom wall 6. The light shines on the back side of the lens 2a in the direction of travel indicated by arrow 7. When mounted, the outer surfaces of the upper and lower walls 4, 6, front edge 2 and lens 2a are in substantially direct continuation of the adjacent surfaces of the aircraft wing to which the light is attached. Internal cross bracing may be provided between the upper and lower walls 4 and 6, if desired.

The light mounting assembly has a frame with a top wall 8, a bottom wall 9 and side walls 10. Fixed on the bottom wall are a plurality of nuts 11 for fastening screws extending through the wall 6. The frame is, accordingly, rigidly mounted on the lower surface of the aircraft wing. Between the upper and lower walls 8 and 9 of the frame is a light carrying assembly comprising upper and lower plates 12 and 13 of generally rectangular outline. The lower plate 13 is recessed to receive washers 14, power terminals 15 and terminals 16 of lamp 16a. The screws 17 and 18 secure the plates 12 and 13 together and, in addition, make the electrical connections between the terminals 15 and 16.

In the outer surfaces of the plates 12 and 13 are spring seats 19 generally at the corners of the plates. Similar spring seats are arranged in the top and bottom walls 8 and 9 of the frame. Four pairs of coil springs 21 arranged between the respective seats provide the spring suspension for the light carrying assembly. Since the springs are located at the four corners of the lamp carrying members, rocking or tilting of the lamp is prevented so that the lamp remains within the allotted space envelope.

Under severe shock and vibration conditions such as encountered near the wing tips of supersonic aircraft, large amplitude excursions of the lamp with resultant breakage would occur unless substantial damping were provided. This is provided by the damper shown in FIGS. 6 and 7 having upper and lower cup shaped housings 22, 23 with non circular flanges 24, 25 suitably secured together. The upper plate 12 is recessed to non rotatably receive the flanges 24, 25 and has an opening 26 through which the cylindrical section 27 projects. The lower plate 13 is recessed to receive the cylindrical section 28. When the plates 12 and 13 are secured together, the housing for the damper is fixed between the plates. At the center of the damper is a stem 29 having its upper end projecting through an opening 30 in the upper housing 22 and its lower end projecting through an opening 31 in the lower housing 23. The upper end of the stem is fixed at 32 to the top wall 8 of the frame and the lower end of the stem is fixed at 33 to the bottom wall 9 of the frame. Surrounding the stem 29 are a plurality of segmental shoes 34 faced with carbon or other high temperature friction material 35 and urged into engagement with the stem by garter springs 36. While the friction material 35 is always in contact with the stem, no damping takes place until the excursion of the stem 29 along its length is sufficient to take up the clearance between the shoes 34 and upper and lower plates 37 and 38 which are held against an annular spacer 39 by wave washers 40 arranged between the bottoms of the housings 22 and 23 and washers 41 which slidably engage the plates 37, 38. There is a clearance indicated at 42 between the plates 37, 38 and the stem 29.

Under normal conditions, the vibration is cushioned by the springs 21 which provide a soft suspension providing a high degree of protection. The clearance 43 between the friction shoes 34 and the plates 37, 38 and the clearance 42 between the plates 37, 38 and the stem 29 is sufficient so that the damper does not come into action under normal conditions. Should the stem 29 and friction shoes 34 be off center so as to reduce the clearance, the contact will shift the parts so that equal clearance is presented and no damping action is obtained. This is the ideal condition for vibration isolation. Under resonance and shock, large amplitude excursions of the lamp can occur, moving it outside the allotted space envelope. This is prevented by the damper. Movement along the axis of the stem 29 is resisted by the friction damping of the shoes 34 on the stem. Movement in any direction at right angles to the axis of the stem 29 is resisted by friction between the plates 37, 38 and the washers 41.

In the modification of FIGS. 9, 10 and 11, corresponding parts are indicated by the same reference numerals. The lamp carrying assembly differs primarily in that the upper and lower plates 12a and 13a carry a counter weight 44 at the back, thereby shifting the center of gravity 44a well to the rear of the lamp 16a. Another difference is in the stiffness of the coil springs arranged between the plates 12a, 13a and the upper and lower frame members 8 and 9.

In the previously described construction, the springs 21 were all of substantially the same stiffness and the center of gravity of the lamp carrying assembly was centered between the springs so that the relative motion between the lamp carrying assembly and the frame was primarily translated in a vertical direction or normal to the upper and lower frame members.

In the modification, the front springs 21a are substantially stiffer than the rear springs 21b. This is of minor importance at the normal vibration frequencies to be isolated, but is of significant importance in enabling the lamp 16a to resist low frequency vibration at frequencies below the natural frequency of the spring supporting system. At these low frequencies, the transmissibility of vibrations is amplified while at the higher frequencies above the natural frequency of the spring suspension system the transmissibility of these vibrations is reduced. By having the front springs 21a stiffer than the rear springs 21b, at low frequencies (i.e., at frequencies below the natural frequency of the suspension system) the springs 21a act substantially as pivot points for the front end of the lamp carrying assembly and the motion of the asssembly takes place primarily at the counter weight. This protects the lamp filament and thereby materially extends the life of the lamp. The effect is to reduce amplification of the low frequency vibration in the region of the lamp 16a.

In a practical installation where the natural frequency of the lamp supporting spring suspension was about 130 cycles per second, the transmissibility of vibration at 80 cycles per second was reduced from approximately 2.5 for the suspension using springs 21 to 1.2 for the suspension using springs 21a and 21b. This transmissibility is in the region of the lamp and resulted in a substantial improvement in the life of the lamp. For the spring suspension using springs 21, the life of the filament was approximately three to four hours, while the suspension with springs 21a and 21b had a lamp filament life of substantially 180 hours.

Another difference is in the additional dampers provided at the side edges of the lamp carrying assembly. Each of these dampers has a spring 46 arranged between a spring seat 47 fixed to the top frame 3 and a cup 48 having friction damping material bearing on edges 49 of the lamp carrying assembly. There are four dampers engaging the fore and aft edges of the right and left sides of the lamp carrying assembly. These dampers introduce friction damping for all relative motion between the lamp carrying assembly and the frame in directions fore and aft or up and down. These dampers are effective for rocking modes and also supplement the main damper shown in FIG. 6 which is primarily responsive to translation. The combination of the four dampers damps rocking movement which takes place because of the difference in stiffness of the front and back springs 21a and 21b.

What is claimed as new is:

1. A light comprising a frame having upper and lower walls, a rectangular lamp carrying assembly between the upper and lower walls of the frame, coil springs arranged between the corners of the assembly and the upper and lower walls of the frames, a damper housing fixed to the assembly, a stem extending through the housing and fixed at its upper and lower ends to the upper and lower walls of the frame, friction members gripping said stem, upper and lower plates spaced above and below said friction members and having clearance openings through which the stem extends whereby limited excursion of the stem relative to the plates takes place before compelling movement of the friction members and plates, and friction means connected between the housing and said upper and lower plates.

2. The light of claim 1 in which the frame is an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls.

3. A light comprising a frame having upper and lower walls, a rectangular lamp carrying assembly between the upper and lower walls of the frame, coil springs arranged between the corners of the assembly and the upper and lower walls of the frames, a damper housing fixed to the assembly, a stem extending through the housing and fixed at its upper and lower ends to the upper and lower walls of the frame, segmental friction members surrounding the stem, garter spring means urging the friction members against the stem, upper and lower plates spaced above and below said friction members and having clearance openings through which the stem extends whereby limited excursion of the stem relative to the plates takes place before compelling movement of the friction members and plates, and friction dampers connected between the housing and said upper and lower plates.

4. The light of claim 3 in which the frame is an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls.

5. A light comprising a frame having upper and lower walls, a rectangular lamp carrying assembly between the upper and lower walls of the frame, a lamp supported by the assembly at the front of the frame, coil springs arranged between the front and back corners of the assembly and the upper and lower walls of the frames, the center of gravity of the assembly being to the rear of the front springs and the front springs being stiffer than the back springs whereby at frequencies below resonance the assembly has greater movement at the rear than at the front, and damping means for resisting relative movement between the assembly and frame.

6. The light of claim 5 in which the frame comprises an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls.

7. A light comprising a frame, a lamp carrying assembly, a lamp supported by the assembly at the front of the frame, spring means for supporting the assembly on the frame, the spring means being stiffer at the front of the frame than at the back of the frame and the center of gravity of the assembly being to the rear of the front of the frame whereby at frequencies below resonance the assembly has greater movement at the rear than at the front, and damping means for resisting relative movement between the assembly and frame.

8. The light of claim 7 in which the frame comprises an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls.

9. A light comprising a frame having upper and lower walls, a lamp, a rectangular lamp carrying assembly between the upper and lower walls of the frame, said assembly having upper and lower plates, said lamp having a bulb at the front edge of the assembly between the upper and lower walls at the front of the frame and spaced from the assembly and terminals projecting from the bulb and clamped between the plates for supporting the bulb, spring means for supporting the assembly on the frame, and friction damping means for resisting relative movement between the assembly and frame.

10. The light of claim 9 in which the damping means includes friction members connected to the frame and engaging the edges of said upper and lower plates.

11. A light comprising a frame having upper and lower walls, a lamp, a rectangular lamp carrying assembly between the upper and lower walls of the frame, said assembly having upper and lower plates, said lamp having a bulb between the upper and lower walls at the front of the frame and spaced from the assembly, spring means for supporting the assembly on the frame, said spring means being stiffer at the front of the frame and the center of gravity of the assembly being to the rear of the front of the frame whereby at frequencies below resonance the assembly has greater movement at the rear than at the front.

12. The light of claim 11 in which the frame is an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls, and said frame holding the lamp positioned to shine on the back side of the lens.

13. A light comprising a frame having upper and lower walls, a lamp, a rectangular lamp carrying assembly between the upper and lower walls of the frame, said assembly having upper and lower plates, said lamp having a bulb between the upper and lower walls at the front of the frame and spaced from the assembly, spring means for supporting the assembly on the frame, and damping means for resisting relative movement between the assembly and frame, said damping means comprising a damper housing fixed to the assembly, a stem extending through the housing and fixed at its upper and lower ends to the upper and lower walls of the frame, friction members gripping said stem, said damping means having upper and lower plates spaced above and below said friction members and having clearance openings through which the stem extends whereby limited excursion of the stem relative to the plates takes place before compelling movement of the friction members and plates.

14. The light of claim 13 in which the frame is an insert for mounting in the front edge of an aircraft wing, said insert having a front edge and upper and lower walls in substantially direct continuation of the front edge and upper and lower surfaces of the wing, a lens fixed in the front edge of the insert having its back side between said upper and lower walls, and said frame holding the lamp positioned to shine on the back side of the lens.

References Cited by the Examiner

UNITED STATES PATENTS

| | | | |
|---|---|---|---|
| 804,884 | 11/1905 | Rutan | 248—20 |
| 1,555,902 | 10/1925 | Brady | 240—90 |
| 1,802,589 | 4/1931 | Thompson | 240—90 |
| 2,328,032 | 8/1943 | Roper | 240—7.7 |
| 2,459,537 | 1/1949 | Oberstadt | 188—129 |
| 2,620,434 | 12/1952 | Edmunds | 240—90 |
| 2,715,952 | 8/1955 | Barnett | 188—129 |
| 2,800,578 | 7/1957 | Falge | 240—90 |
| 2,804,539 | 8/1957 | Robbins | 240—90 X |
| 2,881,307 | 4/1959 | Adler | 240—7.7 |

NORTON ANSHER, *Primary Examiner.*